(12) United States Patent
Izutsu et al.

(10) Patent No.: US 11,027,685 B2
(45) Date of Patent: Jun. 8, 2021

(54) VEHICLE BODY STRUCTURE

(71) Applicant: HONDA MOTOR CO., LTD., Tokyo (JP)

(72) Inventors: Masaki Izutsu, Wako (JP); Yoichiro Hamano, Wako (JP); Tokihisa Ueta, Wako (JP); Tomohiro Yoshimura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 16/130,556

(22) Filed: Sep. 13, 2018

(65) Prior Publication Data

US 2019/0084514 A1    Mar. 21, 2019

(30) Foreign Application Priority Data

Sep. 15, 2017    (JP) .............................. JP2017-177246

(51) Int. Cl.
*B60R 21/02*    (2006.01)
*B62D 25/20*    (2006.01)
(Continued)

(52) U.S. Cl.
CPC .............. *B60R 21/02* (2013.01); *B62D 21/15* (2013.01); *B62D 25/2036* (2013.01);
(Continued)

(58) Field of Classification Search
CPC ...... B62D 21/15; B62D 21/152; B62D 25/14; B62D 25/16; B62D 25/20; B62D 25/2018;
(Continued)

(56) References Cited

U.S. PATENT DOCUMENTS 4,068,884 A * 1/1978 Watanabe .............. B62D 21/10
                                                    280/790
4,669,776 A * 6/1987 Harasaki .............. B62D 25/025
                                                    296/192
(Continued)

FOREIGN PATENT DOCUMENTS

JP         62105779 A  *  5/1987
JP         01254476 A  * 10/1989
(Continued)

OTHER PUBLICATIONS

Japanese Office Action dated Feb. 19, 2019, 4 pages.

*Primary Examiner* — Laura Freedman
(74) *Attorney, Agent, or Firm* — Rankin, Hill & Clark LLP

(57) ABSTRACT

A vehicle body structure has: a front plate portion that faces in a vehicle front-rear direction; an inclined portion that obliquely descends rearward from a lower end of the front plate portion and is coupled to a floor panel making up a floor surface of a cabin; an arch-shaped portion located at outer end portions in a vehicle width direction of the front plate portion and the inclined portion and makes up a wheel arch-shaped rear portion of a tire house; a front side frame located inward of the arch-shaped portion in the vehicle width direction and extends from the front plate portion to the inclined portion in the vehicle front-rear direction; and a reinforcement panel placed over the arch-shaped portion. The reinforcement panel is disposed outward in the vehicle width direction of an innermost portion in the vehicle width direction in the arch-shaped portion.

8 Claims, 5 Drawing Sheets

(51) Int. Cl.
  *B62D 21/15* (2006.01)
  *B60R 21/00* (2006.01)
(52) U.S. Cl.
  CPC .. *B62D 25/2045* (2013.01); *B60R 2021/0004* (2013.01); *B60R 2021/0046* (2013.01); *B60R 2021/0051* (2013.01); *B60R 2021/0053* (2013.01); *B60R 2021/024* (2013.01); *B60R 2021/0213* (2013.01); *B62D 25/20* (2013.01)
(58) Field of Classification Search
  CPC ............ B62D 25/2036; B62D 25/2045; B60R 21/02; B60R 2021/0004; B60R 2021/0046; B60R 2021/0051; B60R 2021/0053; B60R 2021/0213; B60R 2021/024
  See application file for complete search history.

(56) References Cited

U.S. PATENT DOCUMENTS

| | | | | |
|---|---|---|---|---|
| 4,804,222 | A * | 2/1989 | Sakiyama | B62D 25/082 296/203.02 |
| 5,560,674 | A * | 10/1996 | Tazaki | B62D 21/09 296/193.01 |
| 6,364,401 | B1 * | 4/2002 | Kim | B62D 25/04 296/187.03 |
| 6,585,068 | B2 * | 7/2003 | Matsushita | B62D 25/14 180/90 |
| 7,059,667 | B2 * | 6/2006 | Tomita | B62D 25/2018 296/203.03 |
| 7,832,795 | B2 * | 11/2010 | Yokoi | B62D 25/2018 296/193.02 |
| 7,900,995 | B2 * | 3/2011 | Sato | B62D 21/157 280/784 |
| 8,075,047 | B2 * | 12/2011 | Yamada | B62D 25/04 296/193.09 |
| 8,382,195 | B2 * | 2/2013 | Iwase | B62D 25/025 296/187.12 |
| 8,469,442 | B1 * | 6/2013 | Pencak | B62D 25/14 296/187.12 |
| 8,474,563 | B2 * | 7/2013 | Naoi | B62D 25/14 180/90 |
| 8,491,049 | B2 * | 7/2013 | Naoi | B62D 25/2045 296/193.02 |
| 8,690,227 | B2 * | 4/2014 | Matsuoka | B62D 21/155 296/187.09 |
| 8,702,148 | B2 * | 4/2014 | Ichikawa | B62D 25/08 180/90 |
| 8,764,103 | B2 * | 7/2014 | Toba | B62D 21/02 296/187.09 |
| 8,939,496 | B2 * | 1/2015 | Obayashi | B62D 21/152 296/187.08 |
| 9,180,916 | B2 * | 11/2015 | Nishida | B62D 25/2036 |
| 9,238,485 | B2 * | 1/2016 | Atsumi | B62D 25/2045 |
| 9,266,567 | B1 | 2/2016 | Young et al. | |
| 9,381,952 | B2 * | 7/2016 | Furusaki | B62D 21/152 |
| 9,643,654 | B2 * | 5/2017 | Furusaki | B62D 21/152 |
| 9,643,659 | B2 * | 5/2017 | Ohigashi | B62D 25/14 |
| 9,873,460 | B2 * | 1/2018 | Tatsuwaki | B62D 25/14 |
| 10,000,239 | B2 * | 6/2018 | Tatsuwaki | B62D 21/11 |
| 10,118,647 | B2 * | 11/2018 | Yoshida | B62D 25/20 |
| 10,160,493 | B2 * | 12/2018 | Atsumi | B62D 25/2018 |
| 10,232,891 | B2 * | 3/2019 | Yoshida | B62D 25/2036 |
| 10,351,178 | B2 * | 7/2019 | Han | B62D 25/018 |
| 2012/0119542 | A1 * | 5/2012 | Mildner | B62D 25/082 296/187.09 |
| 2016/0052561 | A1 * | 2/2016 | Atsumi | B62D 25/2018 296/187.08 |
| 2016/0272253 | A1 | 9/2016 | Yoshida et al. | |
| 2019/0077464 | A1 * | 3/2019 | Izutsu | B62D 25/2018 |

FOREIGN PATENT DOCUMENTS

| | | |
|---|---|---|
| JP | 2000-016333 A | 1/2000 |
| JP | 2016-172484 A | 9/2016 |

* cited by examiner

VEHICLE BODY STRUCTURE

BACKGROUND OF THE INVENTION

Field of the Invention

The present invention relates to a vehicle body structure of a portion that continues from a dashboard to a floor panel.

Description of the Related Art

A vehicle body structure has been devised that suppresses deformation of a foot space in a cabin in frontal collision of a vehicle.

For example, Japanese Patent Application Publication No. 2016-172484 proposes a configuration in which a reinforcement panel is provided on a wheel arch-shaped portion in an outer end portion of a dash lower panel in a vehicle width direction.

This vehicle body structure allows a front wheel to suppress deformation of the wheel arch-shaped portion in oblique collision (collision obliquely from the front of a vehicle).

Meanwhile, the vehicle body structure of Japanese Patent Application Publication No. 2016-172484 is characterized in that the dash lower panel is unlikely to deform in full-lap frontal collision (frontal collision).

For this reason, there is a problem that it is difficult to employ this structure for a vehicle which has a small space in front of a cabin and is designed to absorb collision energy by causing a dashboard lower to deform.

SUMMARY OF THE INVENTION

The present invention has been made in view of the above-described point and an object thereof is to provide a vehicle body structure that can suppress deformation of a foot space in oblique collision and also effectively absorb collision energy in full-lap collision.

To achieve the above-described object, a vehicle body structure of the present invention includes: a front plate portion that faces in a vehicle front-rear direction; an inclined portion that obliquely descends rearward from a lower end of the front plate portion and is coupled to a floor panel making up a floor surface of a cabin; an arch-shaped portion that is located at outer end portions in a vehicle width direction of the front plate portion and the inclined portion and makes up a wheel arch-shaped rear portion of a tire house; a front side frame that is located inward of the arch-shaped portion in the vehicle width direction and extends from the front plate portion to the inclined portion in the vehicle front-rear direction; and a reinforcement panel that is placed over the arch-shaped portion, wherein the reinforcement panel is disposed outward in the vehicle width direction of an innermost portion in the vehicle width direction in the arch-shaped portion.

According to the present invention, it is possible to provide a vehicle body structure that can suppress deformation of the foot space in oblique collision and also effectively absorb collision energy in full-lap collision.

DETAILED DESCRIPTION OF THE EMBODIMENTS

An embodiment of the present invention will be described in detail with reference to the accompanying drawings as necessary. The same components are denoted by the same reference signs and repetitive description will be omitted.

In addition, since a vehicle body structure of the present embodiment is formed substantially in left-right symmetry, in the following description, the structure on the left side will mainly be described and description of the structure on the right side will not be omitted.

Figure 1:
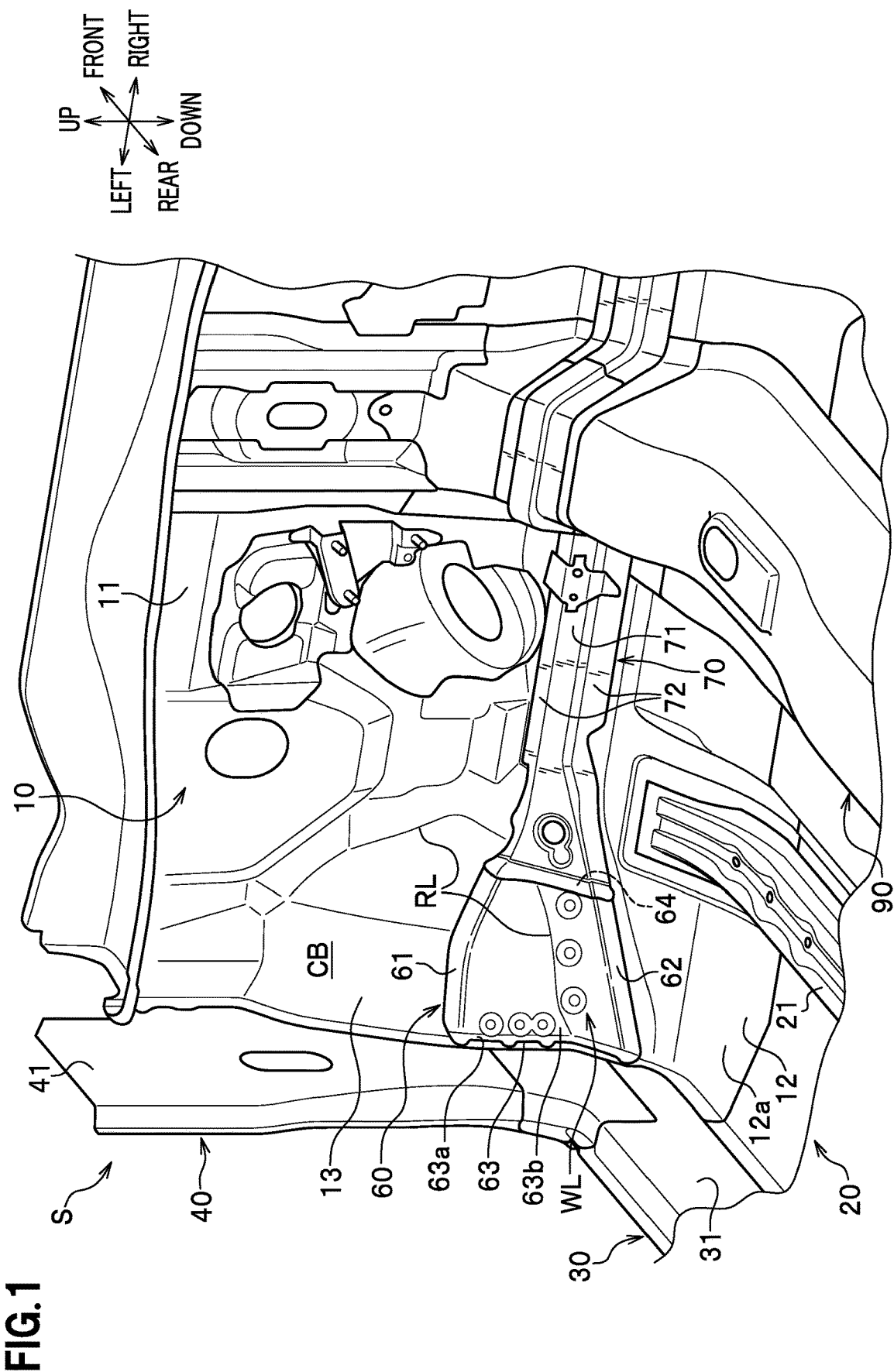
FIG. 1 is a perspective view showing a vehicle body structure according to a present embodiment.
Figure 2:
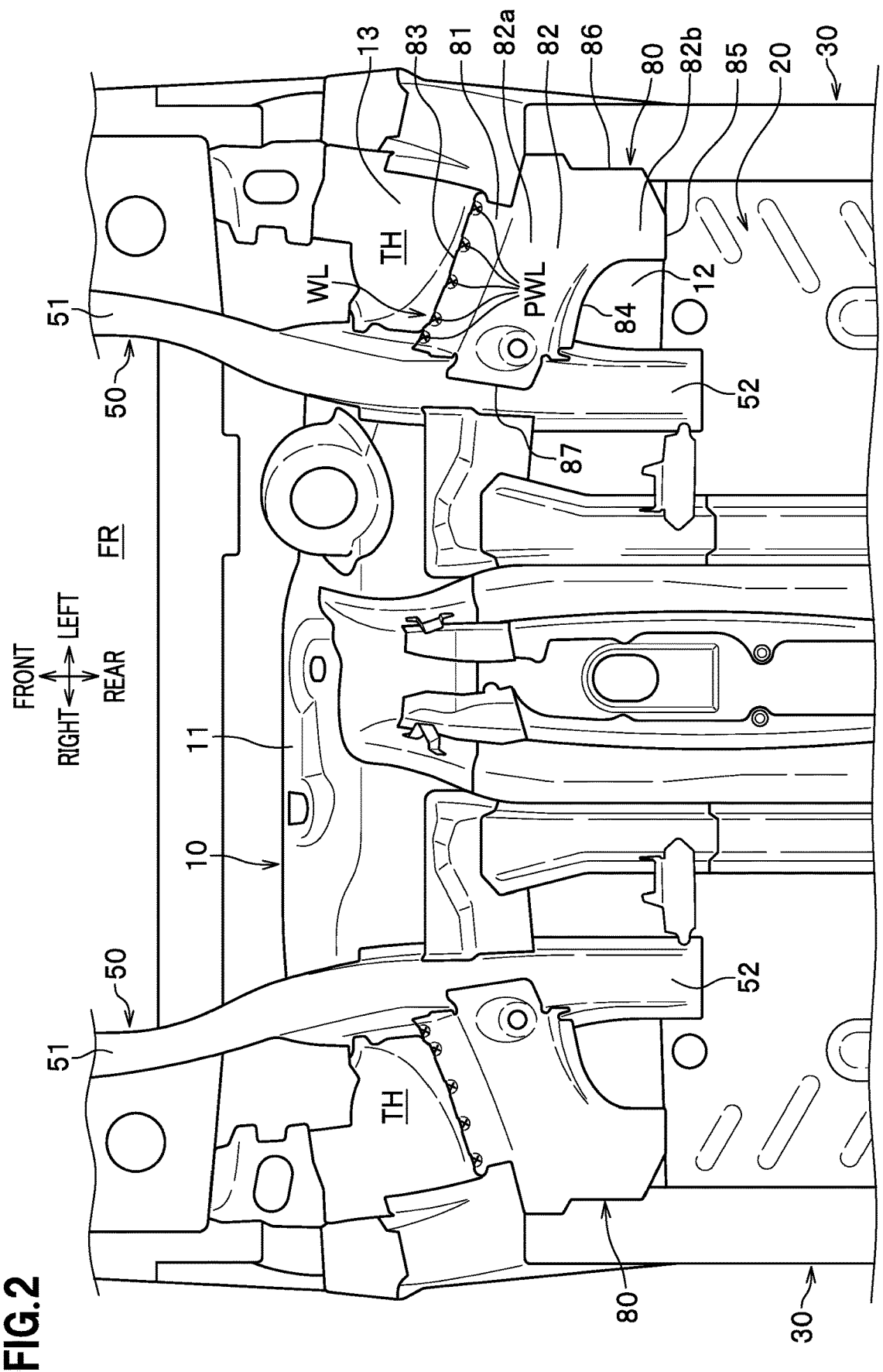
FIG. 2 is a bottom view showing the vehicle body structure according to the present embodiment.

As shown in FIG. 1 and FIG. 2, in a vehicle including a vehicle body structure S according to the present embodiment, a front room FR and a tire house TH are set up in a front portion of a vehicle body.

The front room FR houses a power unit such as an engine (not shown).

The tire house TH is set up on either side of the front room FR and houses a front wheel (not shown).

Behind the front room FR and the tire house TH, a cabin CB where an occupant gets adjoins. The front room FR and the cabin CB are compartmentalized by a dashboard 10.

The cabin CB has a floor surface made up of a floor panel 20. In addition, the left-side foot portion of the cabin CB is made up of a side sill 30 and a front pillar 40 in addition to the aforementioned dashboard 10.

As shown in FIG. 1 and FIG. 2, the dashboard 10 is made up of a plate-shaped member molded in a predetermined shape by pressing or the like, compartmentalizes the front room FR and the cabin CB, and also forms a front wall portion of the cabin CB. An outer end portion of the dashboard 10 in the vehicle width direction is joined to a lower end portion of the front pillar 40 and a front end portion of the side sill 30. In addition, the dashboard 10 includes a front plate portion 11, an inclined portion 12, an arch-shaped portion 13, and a cut portion.

The front plate portion 11 extends in the vehicle up-down direction and the vehicle width direction such that its plate surface faces in the vehicle front-rear direction.

The inclined portion 12 is inclined downward, rearward from a lower end of the front plate portion 11, and descends to the height of the floor surface of the cabin CB and is coupled to a front end portion of the floor panel 20. In other words, the inclined portion 12 obliquely couples the front plate portion 11 and the floor panel 20.

Note that the inclined portion 12 of the present embodiment includes at its lower end (rear end) a floor plate portion 12a, which substantially horizontally extends rearward and makes up part of the floor surface of the cabin CB.

The arch-shaped portion 13 is set up on each end portion of the dashboard 10 in the vehicle width direction and makes up an arch-shaped rear portion of a wheel house (not shown) which covers an upper half of the front wheel (not shown) of the vehicle. In addition, the arch-shaped portion 13 is curved into a substantially spherical shape which bulges on the cabin CB side to bridge the front plate portion 11 and the inclined portion 12.

The cut portion is formed of a depressed cutaway open downward in the central portion of the dashboard 10 in the vehicle width direction, and is formed to extend into and between the front plate portion 11 and the inclined portion 12. In addition, to the cut portion, a tunnel member 90 which is disposed along the vehicle front-rear direction is joined.

On the dashboard 10 configured as described above, a front side frame 50, a reinforcement panel 60, a cross-member 70, and an outrigger 80 are placed.

Next, the floor panel 20 will be described.

Figure 3:
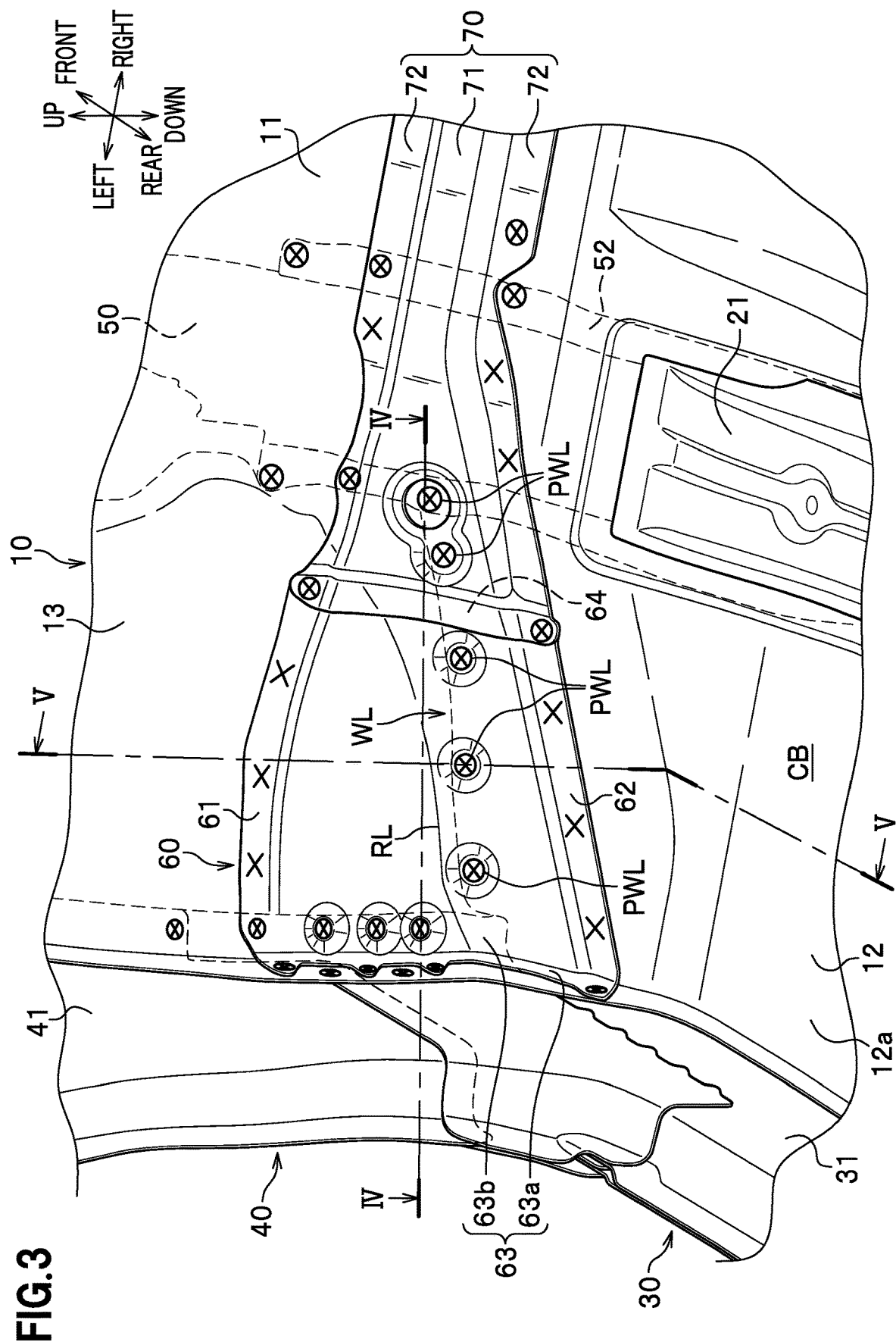
FIG. 3 is an enlarged perspective view of a main portion showing the vehicle body structure according to the present embodiment.

As shown in FIG. 3, the floor panel 20 is made up of a plate-shaped member molded in a predetermined shape by pressing or the like, and makes up the floor surface of the cabin CB. In addition, on an end edge portion of the floor panel 20 in the vehicle width direction, the side sill 30 extends along the vehicle front-rear direction. Moreover, on a central portion of the floor panel 20 in the vehicle width direction, the tunnel member 90 extends along the vehicle front-rear direction.

Note that on a cabin inner-side surface of the floor panel 20, a floor reinforcement frame 21 which extends from a rear end portion of the front side frame 50 is placed.

Next, the side sill 30 will be described.

Figure 4:
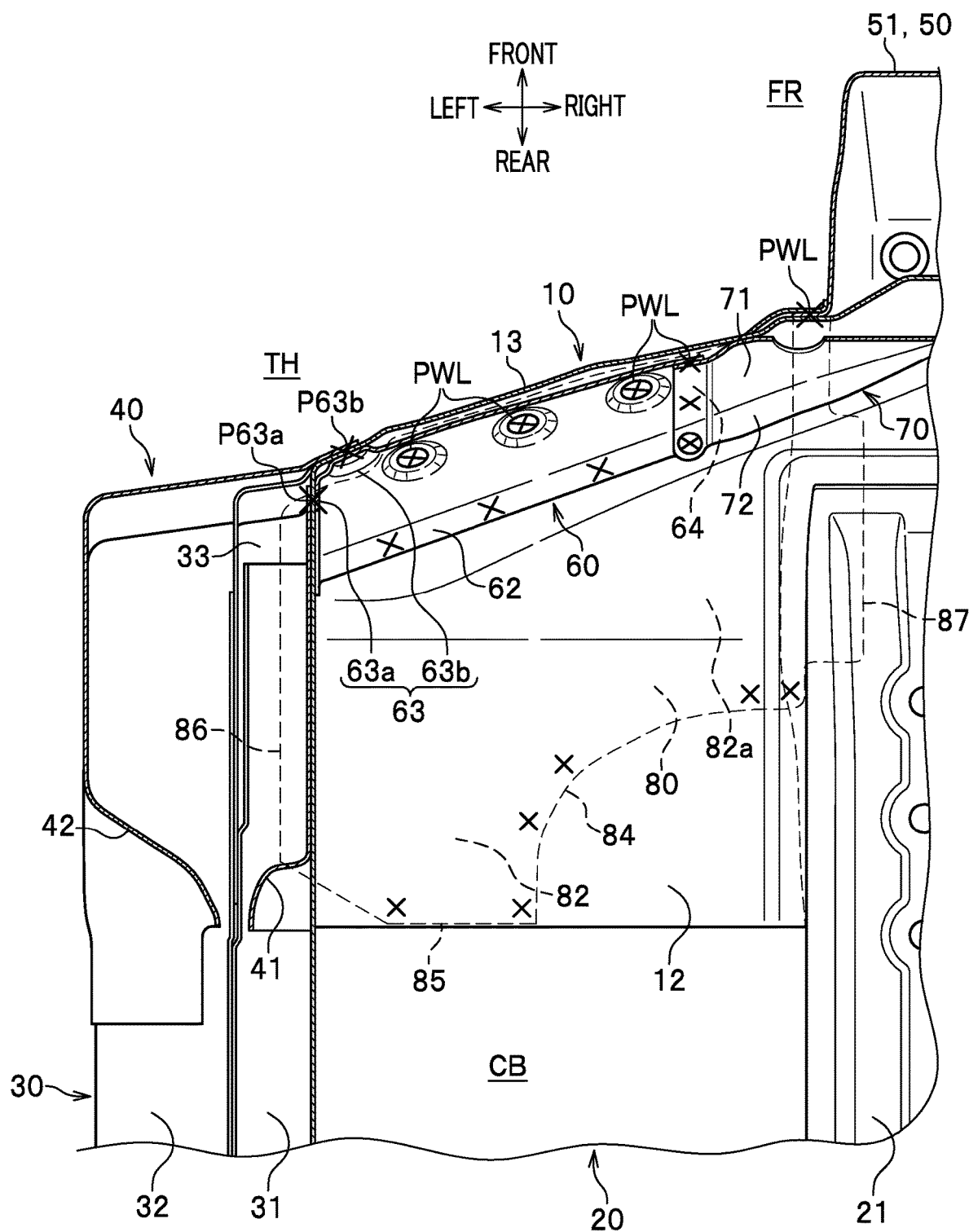
FIG. 4 is a cross-sectional view taken along line IV-IV in FIG. 3, showing the vehicle body structure according to the present embodiment.

As shown in FIG. 1, FIG. 3, and FIG. 4, the side sill 30 is made up of a hollow member extending in the vehicle front-rear direction and having a rectangular tubular shape. In addition, the side sill 30 makes up a side edge portion of the floor surface of the cabin CB.

The rectangular tubular shape of the side sill 30 is made up of a side sill inner 31 on the cabin CB side and a side sill outer 32 on the vehicle outer side. In addition, between the side sill inner 31 and the side sill outer 32, a side sill stiffener 33 is held.

On a front end portion of the side sill 30, a front pillar 40 is joined in such a manner as to surround the outer periphery of the front end portion.

As shown in FIG. 4, the side sill inner 31 is formed in a hat shape including an angular U-shaped groove which is open to the vehicle outer side in a cross-sectional view and extends in the vehicle front-rear direction.

The side sill outer 32 is formed in a hat shape including an angular U-shaped groove which is open to the vehicle inner side in a cross-sectional view and extends in the vehicle front-rear direction.

That is, the side sill inner 31 and the side sill outer 32 are arranged such that their angular U-shaped grooves are combined with each other to form a rectangular tube.

The side sill stiffener 33 is a reinforcement member which is joined in a state of being held between the side sill inner 31 and the side sill outer 32 and which suppresses collapse of the side sill 30.

Next, the front pillar 40 will be described.

As shown in FIG. 4, the front pillar 40 is made up of a hollow member extending in the vehicle up-down direction and having a rectangular tubular shape. Then, the front pillar 40 makes up a front edge portion of a side surface opening portion of the vehicle body and supports a door (not shown) in an openable and closable manner.

The rectangular tubular shape of the front pillar 40 is made up of a front pillar inner 41 and a front pillar outer 42. In addition, a front end portion of the side sill 30 is enclosed inside the rectangular tubular shape of the front pillar 40.

Figure 5:
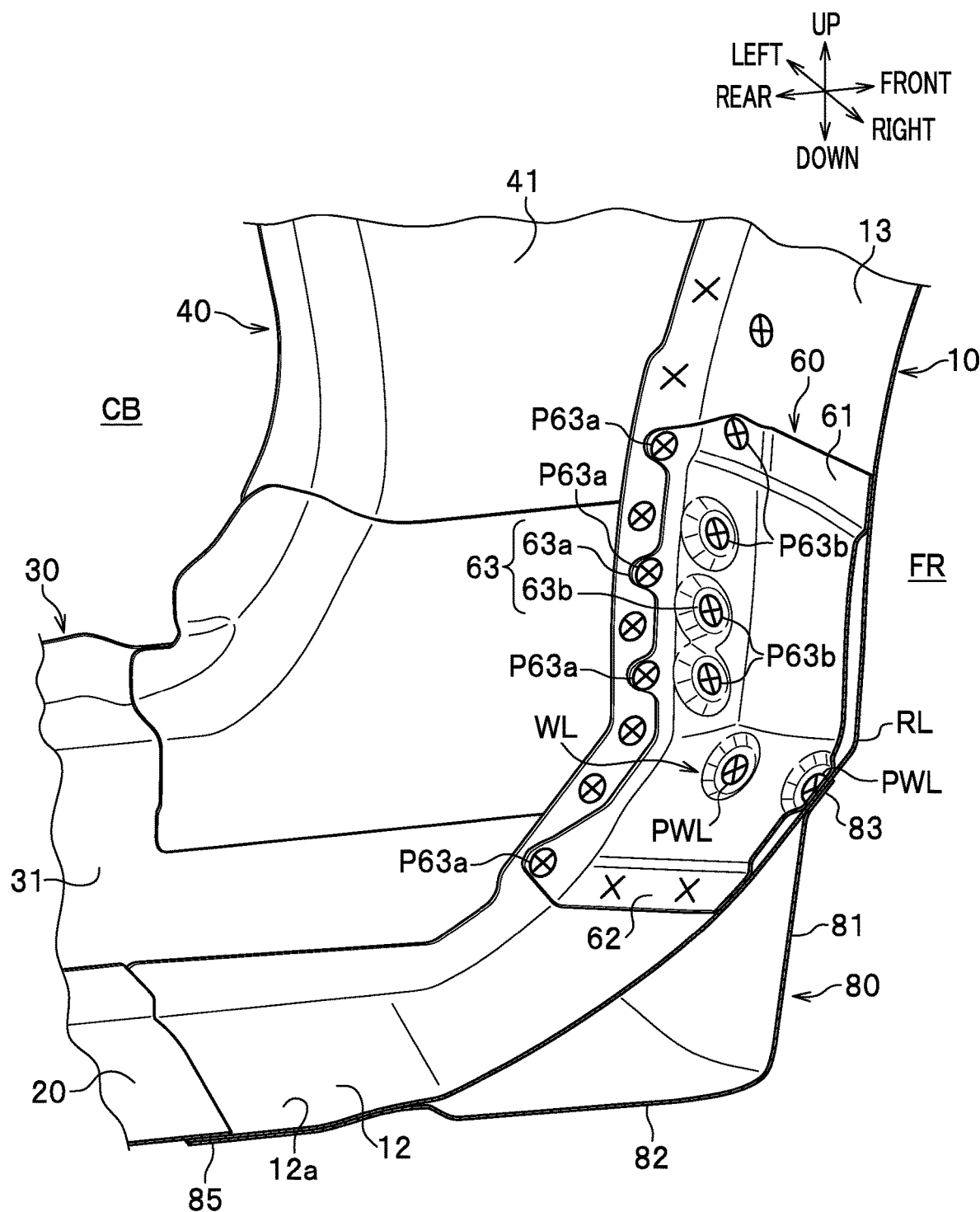
FIG. 5 is a cross-sectional view taken along line V-V in FIG. 3, showing the vehicle body structure according to the present embodiment.

As shown in FIG. 4 and FIG. 5, an inside side surface portion of the rectangular tubular shape in the front pillar 40 is made up of the front pillar inner 41.

A front surface portion and an outside side surface portion of the rectangular tubular shape in the front pillar 40 are made up of the front pillar outer 42.

In a rear surface portion of the rectangular tubular shape in the front pillar 40, the front pillar inner 41 and the front pillar outer 42 are joined, following the mated surfaces of the side sill inner 31 and the side sill outer 32.

A front edge side of the front pillar inner 41 is joined to the dashboard 10 (the arch-shaped portion 13 or the inclined portion 12) and the reinforcement panel 60 with a vehicle-width joint portion 63a, which will be described later (three-piece joint).

A front edge side of the front pillar outer 42 is joined to the arch-shaped portion 13 and the reinforcement panel 60 with a front-rear joint portion 63b, which will be described later (three-piece joint).

Next, the front side frame 50 will be described.

As shown in FIG. 2 and FIG. 3, the front side frame 50 is disposed on each of right and left sides as a pair on a plate surface on the front room FR side of the dashboard 10, which is located inward of the arch-shaped portion 13 in the vehicle width direction.

Note that the front side frame 50 is made up of a frame front portion 51 and a frame rear portion 52.

The frame front portion 51 stands frontward on the plate surface on the front room FR side of the dashboard 10. In addition, the frame front portion 51 is a hollow frame member formed in a substantially rectangular tubular shape, and supports the power unit disposed between the pair of right and left front side frames 50.

Then, a front end portion of the frame front portion 51 is joined to each of left and right end portions of a bumper beam, which is not shown.

The frame rear portion 52 is placed on surfaces on the front room FR side of the front plate portion 11 and the inclined portion 12 of the dashboard 10 along the vehicle front-rear direction. In addition, the frame rear portion 52 is formed in a substantially angular U-shaped groove shape (hat shape) in cross section, which is open rearward (or upward).

The frame rear portion 52 is joined to the dashboard 10, and forms a closed cross section extending in the front-rear direction together with the front plate portion 11 and the inclined portion 12.

Note that on the opposite side of the dashboard 10 from the rear end portion of the frame rear portion 52, the floor reinforcement frame 21 is disposed along the vehicle front-rear direction.

Next, the reinforcement panel 60 will be described.

As shown in FIG. 3, the reinforcement panel 60 is made up of a plate-shaped member having a substantially trapezoidal shape, and is placed on a cabin inner-side surface of the dashboard 10 from a lower half of the arch-shaped portion 13 to the inclined portion 12 rearward of the lower half. Then, the reinforcement panel 60 is laid over, following the curved shape of the arch-shaped portion 13 and the plate surface shape of the inclined portion 12. The reinforcement panel 60 is disposed outward in the vehicle width direction of the innermost portion in the vehicle width direction in the arch-shaped portion 13.

That is, the reinforcement panel 60 is placed outward of the front side frame 50 in the vehicle width direction, and has a shape set up such that a closed cross-sectional space formed between the reinforcement panel 60 and the dashboard 10 is as small as possible.

Of the reinforcement panel 60, a panel upper edge portion 61 extending along the vehicle width direction as an upper edge part is joined to the arch-shaped portion 13.

Of the reinforcement panel 60, a panel lower edge portion 62 extending along the vehicle width direction as a lower edge part is joined to the inclined portion 12.

Of the reinforcement panel 60, the vehicle-width joint portion 63a and the front-rear joint portion 63b are set up in a panel outer edge portion 63 extending in the up-down direction as an outer edge portion in the vehicle width direction.

Note that the vehicle-width joint portion 63a and the front-rear joint portion 63b will be described later in detail.

Of the reinforcement panel 60, a panel inner edge portion 64 extending along the up-down direction as an inner edge portion in the vehicle width direction is joined to an outer edge portion of the cross-member 70 in the vehicle width direction.

In addition, the reinforcement panel 60 is joined to the inclined portion 12 and the outrigger 80 via a ridge line joint portion WL set up along an arch-inclined ridge line RL, which is a ridge line between the arch-shaped portion 13 and the inclined portion 12.

Note that the ridge line joint portion WL will be described later in detail.

In addition, the ridge line mentioned herein indicates a folded line serving as a curved or planar seam, like the seam between the arch-shaped portion 13 and the inclined portion 12.

Next, the cross-member 70 will be described.

As shown in FIG. 3, the cross-member 70 has a hat shape with a member main body 71 having a substantially angular U-shaped groove shape in cross section and a pair of member flange portions 72 extending from edge portions of the angular U-shaped groove in such a way as to be separate from each other. In addition, the cross-member 70 is placed on a cabin inner-side surface of the inclined portion 12 along the vehicle width direction from an inner end portion of the reinforcement panel 60 in the vehicle width direction. Then, the cross-member 70 is joined to the outrigger 80 and the front side frame 50 via the member flange portions 72 with the inclined portion 12 held in between.

Such a cross-member 70 transmits part of impact load inputted to the front side frame 50 to the entire inclined portion 12 and appropriately deforms to absorb the impact energy in collision.

Next, the outrigger 80 will be described.

As shown in FIG. 2 and FIG. 5, the outrigger 80 includes: an outrigger vertical wall portion 81 which extends in the up-down direction while facing in the vehicle front-rear direction; and an outrigger bottom wall portion 82 which extends rearward from a lower end of the outrigger vertical wall portion 81 while facing in the vehicle up-down direction.

Note that the outrigger bottom wall portion 82 is made up in a substantially V shape with a ridge line bottom wall portion 82a which extends along the arch-inclined ridge line RL and a front-rear bottom wall portion 82b which extends along the side sill 30 (the vehicle front-rear direction).

To put it differently, the outrigger 80 is formed in a substantially L shape in a vertical cross-sectional view.

Then, the outrigger 80 is placed on a surface on the front room FR side of the inclined portion 12, which is located rearward of the arch-shaped portion 13, and forms a closed cross-sectional space with a triangular prism shape along the vehicle width direction together with the inclined portion 12.

An outrigger upper edge portion 83 is located on an upper end portion of the outrigger vertical wall portion 81 and is joined to the reinforcement panel 60 and the inclined portion 12 at the ridge line joint portion WL (3-piece joint).

A bottom wall L-shaped edge portion 84, which is an L-shaped inner edge portion, of the outrigger bottom wall portion 82 is joined to the inclined portion 12 (2-piece joint).

A bottom wall vehicle-width rear edge portion 85, which is a rear edge portion, of the outrigger bottom wall portion 82 is joined to a rear edge of the inclined portion 12 and a front edge of the floor panel 20 (3-piece joint).

A bottom wall outer edge portion 86, which is an outer edge portion in the vehicle width direction, of the outrigger bottom wall portion 82 is joined to the inclined portion 12 and the side sill 30 (3-piece joint).

A bottom wall inner edge portion 87, which is an inner edge portion in the vehicle width direction, of the outrigger bottom wall portion 82 is joined to the front side frame 50.

Next, the ridge line joint portion WL will be described.

As shown in FIG. 3, the ridge line joint portion WL is made up of five joint points PWL which are arranged in line on the inclined portion 12 along the arch-inclined ridge line RL.

In the ridge line joint portion WL, the three joint points PWL from the left in FIG. 3 join the reinforcement panel 60, the inclined portion 12, and the outrigger 80 together (3-piece joint). In addition, in the ridge line joint portion WL, the fourth joint point PWL from the left (the second from the right) in FIG. 3 joins the cross-member 70, the inclined portion 12, and the outrigger 80 together (3-piece joint). Moreover, in the ridge line joint portion WL, the fifth joint point PWL from the left (the right end) in FIG. 3 joins the inclined portion 12, the front side frame 50, and the outrigger 80 together (3-piece joint).

Note that in order for the fifth joint point PWL from the left in FIG. 3 to join the inclined portion 12, the front side frame 50, and the outrigger 80, a through-hole is formed in the cross-member 70, and joining means such as an electrode for spot welding is inserted through the through-hole.

Next, the vehicle-width joint portion 63a and the front-rear joint portion 63b will be described.

As shown in FIG. 3 to FIG. 5, the vehicle-width joint portion 63a is set up in a portion which is located on the front pillar 40 side (side sill 30 side) of the ridge line portion (corner portion), being the seam portion between the dashboard 10 and the front pillar 40 or side sill 30, and which faces in the vehicle width direction.

The vehicle-width joint portion 63a is made up of four joint points P63b which are successively aligned along the up-down direction. Then, the three joint points P63b from above in the vehicle-width joint portion 63a join the front pillar inner 41, the arch-shaped portion 13, and the reinforcement panel 60 together (3-piece joint). In addition, the fourth joint point P63b from above (the lowest) in the vehicle-width joint portion 63a joins the side sill inner 31, the inclined portion 12, and the reinforcement panel 60 together (3-piece joint).

The front-rear joint portion 63b is set up in a portion which is located on the dashboard 10 side of the ridge line portion (corner portion), being the seam portion between the dashboard 10 and the front pillar 40, and which faces in the vehicle front-rear direction.

The front-rear joint portion 63b is made up of four joint points P63a which are successively aligned along the up-down direction. Then, each of the joint points P63a in the front-rear joint portion 63b joins the front pillar outer 42, the arch-shaped portion 13, and the reinforcement panel 60 together (3-piece joint).

The vehicle body structure S according to the present embodiment is basically configured as described above. Next, the operations and effects of the vehicle body structure will be described.

In the vehicle body structure S of the present embodiment, the reinforcement panel 60 is arranged outward in the vehicle width direction of the innermost portion in the vehicle width direction of the arch-shaped portion 13.

With such a configuration, the reinforcement panel 60 is disposed without overlapping the front side frame 50.

This allows the front plate portion 11 and the front side frame 50 to deform without being affected by the reinforcement panel 60 to absorb the collision energy in full-lap collision (frontal collision).

In addition, in oblique collision, the reinforcement panel 60 can prevent the front wheel from entering and suppress deformation of the foot space.

In the present embodiment, the reinforcement panel 60 is laid across and over the lower half of the arch-shaped portion 13 to the inclined portion 12 rearward of the lower half while following the shapes of the arch-shaped portion 13 and the inclined portion 12.

With such a configuration, it is possible to place the reinforcement panel 60 without forming a space with a closed cross section between the reinforcement panel 60 and the dashboard 10.

This makes it possible to effectively absorb the collision energy of the oblique collision and the full-lap collision without narrowing the foot space within the cabin CB.

In addition, in the present embodiment, the reinforcement panel 60 is joined to the inclined portion 12 (dashboard 10) via the ridge line joint portion WL which is set up along the arch-inclined ridge line RL.

With such a configuration, it is possible to enhance the stiffness of the lower edge part of the arch-shaped portion 13, which is likely to receive load from the front wheel when the front wheel is pressed toward the cabin in oblique collision.

This makes it possible to suppress deformation of the foot space in the cabin CB in oblique collision and in full-lap collision.

In the present embodiment, the outrigger 80 is disposed on the surface (surface on the front room FR side) on the opposite side from the surface on which the reinforcement panel 60 is placed, in the inclined portion 12, which is rearward of the arch-shaped portion 13, and is joined thereto via the ridge line joint portion WL.

With such a configuration, it is possible to further enhance the stiffness of the lower edge part (ridge line joint portion WL) of the arch-shaped portion 13, which is likely to receive load from the front wheel when the front wheel is pressed toward the cabin in oblique collision.

This make it possible to further suppress deformation of the foot space in the cabin CB in oblique collision and in full-lap collision.

Note that although in the present embodiment, the outrigger 80 is disposed on the surface on the opposite side from the surface where the reinforcement panel 60 is placed, in the inclined portion 12 rearward of the arch-shaped portion 13, the present invention is not limited to such a form.

For example, it is possible to employ a configuration in which the outrigger 80 is disposed to extend into and between the arch-shaped portion 13 and the inclined portion 12, which also provides the same operations and effects. Moreover, in a case where the inclined portion has a shape that is not set up rearward of the arch-shaped portion 13, it is possible to employ a configuration in which the outrigger 80 is disposed only on the arch-shaped portion 13.

The present embodiment includes the cross-member 70 which is joined to the inner end portion of the reinforcement panel 60 in the vehicle width direction, extends along the vehicle width direction, and is joined to the outrigger 80 with the inclined portion 12 held in between.

With such a configuration, the reinforcement panel 60 and the cross-member 70 are joined together, and the reinforcement panel 60 and the cross-member 70 are each joined to the outrigger 80.

This allows the outrigger 80 to reinforce the joint portion between the reinforcement panel 60 and the cross-member 70 in collision.

Then, relative deformation of the reinforcement panel 60 and the cross-member 70 is prevented, thus making it possible to further suppress deformation of the foot space in the cabin CB in oblique collision and in full-lap collision.

In the present embodiment, the reinforcement panel 60 includes: the vehicle-width joint portion 63a, which is set up in a portion facing in the vehicle width direction; and the front-rear joint portion 63b, which is set up in a portion facing in the vehicle front-rear direction, and is joined to the front pillar 40, which makes up a vehicle structural body, via the vehicle-width joint portion 63a and the front-rear joint portion 63b.

With such a configuration, it is possible to join the reinforcement panel 60 to the front pillar 40 on surfaces along two directions, including the surface along the vehicle front-rear direction and the surface along the vehicle width direction.

Then, it is possible to receive a component force of collision load that acts in the perpendicular direction onto the joint surface of one joint portion of the vehicle-width joint portion 63a and the front-rear joint portion 63b, as a component force acting in the shear direction onto the joint surface of the other joint portion.

Since this allows the load inputted into the reinforcement panel 60 to be received as the load along the shear direction in any of full-lap collision and oblique collision, it is possible to suppress separation at the joint points P63a and P63b.

Then, since the separation at the joint points P63a and P63b is suppressed, it is possible to absorb the collision load for a long period of time.

Since the front pillar 40, which makes up the vehicle structural body, is a member which is located at the cabin front end portion, adjoins rearward of the tire house TH, and extends in the up-down direction, it is possible to easily set up the vehicle-width joint portion 63a, which faces in the vehicle width direction, and the front-rear joint portion 63b, which faces the vehicle front-rear direction.

In addition, since the front pillar 40 has a stiffness set to be relatively high among vehicle structural bodies, it is possible to suppress reduction in foot space by absorbing collision load with the front pillar 40.

Note that although in the vehicle body structure S of the present embodiment, the lower end portion of the front pillar 40 is set up as the vehicle structural body to which the reinforcement panel 60 is joined via the vehicle-width joint portion 63a and the front-rear joint portion 63b, the present invention is not limited to this.

For example, it is also possible to employ a configuration in which the front end portion of the side sill 30 is set up as the vehicle structural body to which the reinforcement panel 60 is joined via the vehicle-width joint portion 63a and the front-rear joint portion 63b. This configuration also provides the same operations and effects.

What is claimed is:

1. A vehicle body structure comprising:
   a front plate portion that faces in a vehicle front-rear direction;
   an inclined portion that obliquely descends rearward from a lower end of the front plate portion and is coupled to a floor panel making up a floor surface of a cabin;
   an arch-shaped portion that is located at outer end portions in a vehicle width direction of the front plate portion and the inclined portion and makes up a wheel arch-shaped rear portion of a tire house;
   a front side frame that is located inward of the arch-shaped portion in the vehicle width direction and extends from the front plate portion to the inclined portion in the vehicle front-rear direction;
   a reinforcement panel that is placed over the arch-shaped portion; and
   a cross-member that is joined to an inner end portion of the reinforcement panel in the vehicle width direction, wherein
   the reinforcement panel is disposed only in an area outward of an innermost portion of the arch-shaped portion in the vehicle width direction, and
   the reinforcement panel is joined to the inclined portion with the cross-member via a ridge line joint portion that is set up along a ridge line between the arch-shaped portion and the inclined portion.

2. The vehicle body structure of claim 1, further comprising an outrigger that is disposed on a surface on an opposite side from a surface on which the reinforcement panel is placed, in at least one of the arch-shaped portion and the inclined portion, which is rearward of the arch-shaped portion, and is joined thereto via the ridge line joint portion.

3. The vehicle body structure of claim 2, wherein the ridge line joint portion joins the cross-member, the inclined portion, and the outrigger together.

4. The vehicle body structure of claim 1, wherein the cross-member is joined to the front side frame.

5. A vehicle body structure comprising:
   a front plate portion that faces in a vehicle front-rear direction;
   an inclined portion that obliquely descends rearward from a lower end of the front plate portion and is coupled to a floor panel making up a floor surface of a cabin;
   an arch-shaped portion that is located at outer end portions in a vehicle width direction of the front plate portion and the inclined portion and makes up a wheel arch-shaped rear portion of a tire house;
   a front side frame that is located inward of the arch-shaped portion in the vehicle width direction and extends from the front plate portion to the inclined portion in the vehicle front-rear direction;
   a reinforcement panel that is placed over the arch-shaped portion; and
   an outrigger that is disposed on a surface on an opposite side from a surface on which the reinforcement panel is placed, in at least one of the arch-shaped portion and the inclined portion, which is rearward of the arch-shaped portion, and is joined thereto via a ridge line joint portion that is set up along a ridge line between the arch-shaped portion and the inclined portion,
   wherein the reinforcement panel is disposed outward in the vehicle width direction of an innermost portion in the vehicle width direction in the arch-shaped portion, and wherein the reinforcement panel is laid across and over the arch-shaped portion to the inclined portion rearward of the arch-shaped portion while following shapes of the arch-shaped portion and the inclined portion, and is joined to the inclined portion via the ridge line joint portion.

6. The vehicle body structure according to claim 5, further comprising:
   a cross-member that is joined to an inner end portion of the reinforcement panel in the vehicle width direction, extends along the vehicle width direction, and is joined to the outrigger.

7. The vehicle body structure according to claim 6, wherein
   the reinforcement panel comprises:
   a front-rear joint portion that is set up in a portion facing in a vehicle front-rear direction; and
   a vehicle-width joint portion that is set up in a portion facing in the vehicle width direction, and
   the reinforcement panel is joined to a vehicle structural body that makes up a vehicle body via the front-rear joint portion and the vehicle-width joint portion.

8. The vehicle body structure according to claim 7, wherein
   the vehicle structural body is a front pillar.

* * * * *